(12) United States Patent
He et al.

(10) Patent No.: US 11,553,427 B2
(45) Date of Patent: Jan. 10, 2023

(54) WAKE-UP SIGNALING FOR DISCONTINUOUS RECEPTION GROUPS

(71) Applicant: QUALCOMM Incorporated, San Diego, CA (US)

(72) Inventors: Linhai He, San Diego, CA (US); Peter Pui Lok Ang, San Diego, CA (US); Wooseok Nam, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 63 days.

(21) Appl. No.: 17/122,460

(22) Filed: Dec. 15, 2020

(65) Prior Publication Data

US 2021/0219233 A1 Jul. 15, 2021

Related U.S. Application Data

(60) Provisional application No. 62/959,766, filed on Jan. 10, 2020.

(51) Int. Cl.
*H04W 52/02* (2009.01)
*H04W 76/27* (2018.01)
*H04W 76/28* (2018.01)

(52) U.S. Cl.
CPC ... *H04W 52/0229* (2013.01); *H04W 52/0219* (2013.01); *H04W 76/27* (2018.02); *H04W 76/28* (2018.02)

(58) Field of Classification Search
CPC ......... H04W 52/0229; H04W 52/0219; H04W 76/27; H04W 76/28; H04W 52/0216; Y02D 30/70

USPC ......................................................... 370/318
See application file for complete search history.

(56) References Cited

U.S. PATENT DOCUMENTS

| | | | | |
|---|---|---|---|---|
| 2014/0038579 | A1* | 2/2014 | Henttonen | H04W 52/0216 455/418 |
| 2016/0302153 | A1* | 10/2016 | Martin | H04L 69/28 |
| 2021/0092681 | A1* | 3/2021 | Nory | H04W 76/28 |

FOREIGN PATENT DOCUMENTS

| | | |
|---|---|---|
| WO | WO-2018175760 A1 | 9/2018 |
| WO | WO-2019033112 A1 | 2/2019 |
| WO | WO-2020037319 A1 | 2/2020 |

OTHER PUBLICATIONS

3GPP TSG-RAN2 Meeting #108. Reno, USA. Nov. 18-22, 2019 (Year: 2019).*

(Continued)

*Primary Examiner* — Inder P Mehra
(74) *Attorney, Agent, or Firm* — Qualcomm Incorporated

(57) ABSTRACT

Various aspects of the present disclosure generally relate to wireless communication. In some aspects, a user equipment (UE) may selectively monitor, based at least in part on a configuration of the UE, a cell of a first discontinuous reception (DRX) group for a wake-up signal (WUS); and selectively start, during a DRX cycle of the first DRX group associated with the WUS, a DRX on duration timer for a second DRX group based at least in part on the WUS and whether the second DRX group has a DRX on duration occasion during the DRX cycle of the first DRX group. Numerous other aspects are provided.

30 Claims, 9 Drawing Sheets

(56) References Cited

OTHER PUBLICATIONS

Ericsson: "Email Report [107bis#49] [NRTEI16] CDRX Enhancement for CA", 3GPP TSG-RAN2 Meeting #108, 3GPP Draft; R2-1915292, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 18, 2019-Nov. 22, 2019, Nov. 12, 2019 (Nov. 12, 2019), pp. 1-20, XP051824768, Retrieved from the Internet: URL: https://ftp.3gpp.org/tsg_ran/WG2_RL2/TSGR2_108/Docs/R2-1915292.zip R2-1915292 Email report cDRX enhancement for CA.docx [retrieved on Nov. 12, 2019] p. 7-p. 8p. 16-p. 20, Table of p. 9, row "Mediatek"; paragraph [0002], paragraph [0004].

Ericsson., et al., "CDRX Enhancement for CA", 3GPP Draft; 3GPP TSG-RAN2 Meeting #108, R2-1915289, 3rd Generation Partnership Project (3GPP). Mobilecompetence Centre; 650, Route Deslucioles; F-06921 Sophia-Antipolis Cedex; France, vol. RAN WG2, No. Reno, USA; Nov. 18, 2019-Nov. 228, 2019, Nov. 2019 (Nov. 8, 2019), pp. 1-2, XP051817128, Retrieved from the Internet: URL: https://ftp.3gpp.org/tsg_ran/WG2_RL2/TSGR2_108/Docs/R2-1915289.zip, R2-1915289 cDRX-enhancement for CA.docx [retrieved on Nov. 8, 2019] p. 1-p. 2.

International Search Report and Written Opinion—PCT/US2020/070918—ISA/EPO—dated Apr. 13, 2021.

Qualcomm Inc., et al., "Further Discussions on DRX Group", 3GPP TSG-RAN WG2 Meeting #109 electronic, 3GPP Draft; R2-2001482, 3rd Generation Partnership Project (3GPP), Mobile Competence Centre; 650, Route Deslucioles; F-06921 Sophia-Antipolis Cedex; France, vol. RAN WG2, No. Elbonia; Feb. 24, 2020-Mar. 6, 2020, Feb. 14, 2020 (Feb. 14, 2020), pp. 1-3, XP051849782, Retrieved from the Internet: URL: https://ftp.3gpp.org/tsg_ran/WG2_RL2/TSGR2_109_e/Docs/R2-2001482.zip, R2-2001482 Wakeup signaling with DRX groups.docx [retrieved on Feb. 14, 2020], The whole document.

\* cited by examiner

WAKE-UP SIGNALING FOR DISCONTINUOUS RECEPTION GROUPS

CROSS-REFERENCE TO RELATED APPLICATION

This Patent Application claims priority to Provisional Patent Application No. 62/959,766, filed on Jan. 10, 2020, entitled "WAKE-UP SIGNALING FOR DISCONTINUOUS RECEPTION GROUPS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for wake-up signaling for discontinuous reception groups.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include selectively monitoring, based at least in part on a configuration of the UE, a cell of a first discontinuous reception (DRX) group for a wake-up signal (WUS); and selectively starting, during a DRX cycle of the first DRX group associated with the WUS, a DRX on duration timer for a second DRX group based at least in part on the WUS and whether the second DRX group has a DRX on duration occasion during the DRX cycle of the first DRX group.

In some aspects, a method of wireless communication, performed by a base station, may include determining whether, during a DRX cycle of a first DRX group of a UE, a second DRX group of the UE has a DRX on duration occasion; and selectively transmitting a wake-up signal (WUS), associated with the DRX cycle of the first DRX group, to indicate that the UE is to start a DRX on duration timer during the DRX cycle of the first DRX group, wherein the WUS is selectively transmitted based at least in part on at least one of: whether the second DRX group of the UE has a DRX on duration occasion during the DRX cycle of the first DRX group, or whether the base station has data buffered for transmission via the second DRX group.

In some aspects, a UE for wireless communication may include memory and one or more processors operatively coupled to the memory. The memory and the one or more processors may be configured to selectively monitor, based at least in part on a configuration of the UE, a cell of a first DRX group for a WUS; and selectively start, during a DRX cycle of the first DRX group associated with the WUS, a DRX on duration timer for a second DRX group based at least in part on the WUS and whether the second DRX group has a DRX on duration occasion during the DRX cycle of the first DRX group.

In some aspects, a base station for wireless communication may include memory and one or more processors operatively coupled to the memory. The memory and the one or more processors may be configured to determine whether, during a DRX cycle of a first DRX group of a UE, a second DRX group of the UE has a DRX on duration occasion; and selectively transmit a wake-up signal (WUS), associated with the DRX cycle of the first DRX group, to indicate that the UE is to start a DRX on duration timer during the DRX cycle of the first DRX group, wherein the WUS is selectively transmitted based at least in part on at least one of: whether the second DRX group of the UE has a DRX on duration occasion during the DRX cycle of the first DRX group, or whether the base station has data buffered for transmission via the second DRX group.

In some aspects, a non-transitory computer-readable medium may store one or more instructions for wireless communication. The one or more instructions, when executed by one or more processors of a UE, may cause the one or more processors to: selectively monitor, based at least in part on a configuration of the UE, a cell of a first DRX group for a WUS; and selectively start, during a DRX cycle of the first DRX group associated with the WUS, a DRX on duration timer for a second DRX group based at least in part on the WUS and whether the second DRX group has a DRX on duration occasion during the DRX cycle of the first DRX group.

In some aspects, a non-transitory computer-readable medium may store one or more instructions for wireless communication. The one or more instructions, when executed by one or more processors of a base station, may cause the one or more processors to: determine whether, during a DRX cycle of a first DRX group of a UE, a second DRX group of the UE has a DRX on duration occasion; and selectively transmit a wake-up signal (WUS), associated with the DRX cycle of the first DRX group, to indicate that the UE is to start a DRX on duration timer during the DRX cycle of the first DRX group, wherein the WUS is selectively transmitted based at least in part on at least one of: whether the second DRX group of the UE has a DRX on duration occasion during the DRX cycle of the first DRX group, or whether the base station has data buffered for transmission via the second DRX group.

In some aspects, an apparatus for wireless communication may include means for selectively monitoring, based at least in part on a configuration of the apparatus, a cell of a first DRX group for a WUS; and means for selectively starting, during a DRX cycle of the first DRX group associated with the WUS, a DRX on duration timer for a second DRX group based at least in part on the WUS and whether the second DRX group has a DRX on duration occasion during the DRX cycle of the first DRX group.

In some aspects, an apparatus for wireless communication may include means for determining whether, during a DRX cycle of a first DRX group of a UE, a second DRX group of the UE has a DRX on duration occasion; and means for selectively transmitting a WUS, associated with the DRX cycle of the first DRX group, to indicate that the UE is to start a DRX on duration timer during the DRX cycle of the first DRX group, wherein the WUS is selectively transmitted based at least in part on at least one of: whether the second DRX group of the UE has a DRX on duration occasion during the DRX cycle of the first DRX group, or whether the base station has data buffered for transmission via the second DRX group.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
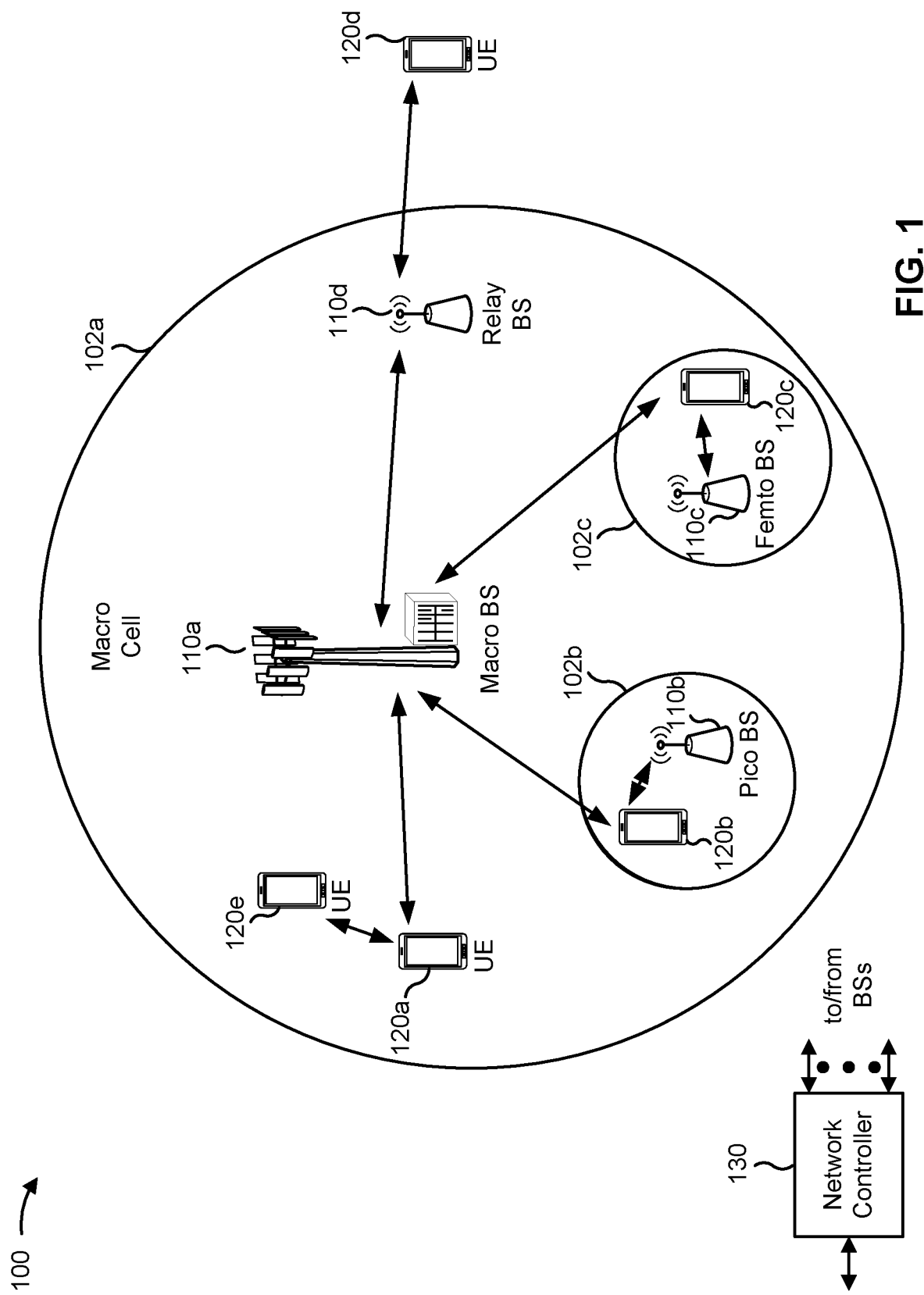
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
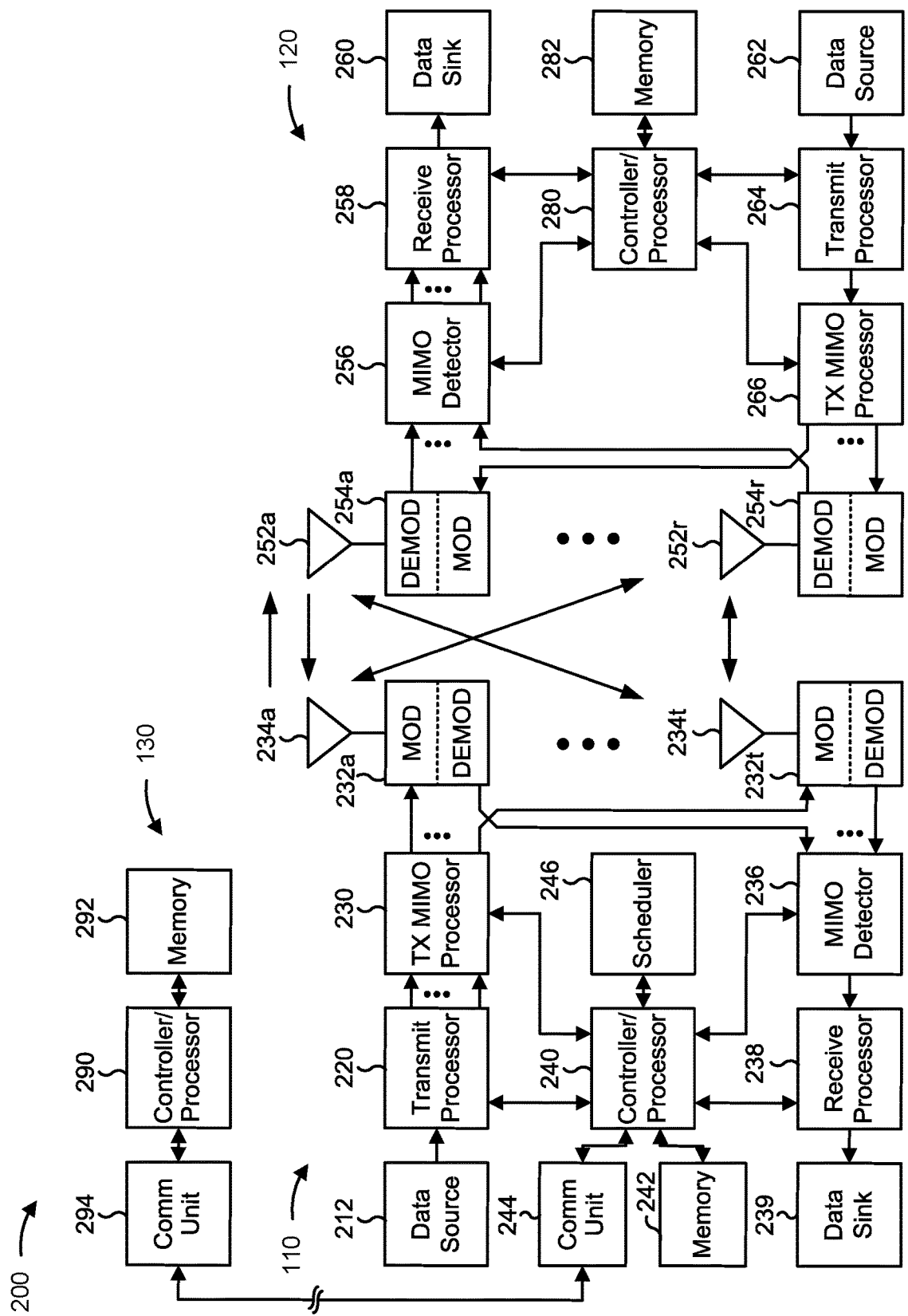
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with wake-up signaling for discontinuous reception (DRX) groups, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of base station 110 and/or UE 120, may perform or direct operations of, for example, process 500 of FIG. 5, process 600 of FIG. 6, and/or other processes as described herein. A scheduler 246 may schedule UEs for data transmission on the downlink and/or uplink.

In some aspects, UE 120 may include means for selectively monitoring, based at least in part on a configuration of UE 120, a cell of a first DRX group for a wake-up signal (WUS); means for selectively starting, during a DRX cycle of the first DRX group associated with the WUS, a DRX on duration timer for a second DRX group based at least in part on the WUS and whether the second DRX group has a DRX on duration occasion during the DRX cycle of the first DRX group; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining whether, during a DRX cycle of a first DRX group of a UE, a second DRX group of the UE has a DRX on duration occasion; means for selectively transmitting a WUS, associated with the DRX cycle of the first DRX group, to indicate that the UE is to start a DRX on duration timer during the DRX cycle of the first DRX group, wherein the WUS is selectively transmitted based at least in part on at least one of: whether the second DRX group of the UE has a DRX on duration occasion during the DRX cycle of the first DRX group, or whether the base station has data buffered for transmission via the second DRX group; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

DRX is a configuration in which a UE may switch between a DRX active time (in which the UE is in active communication with a network) and a DRX inactive time (in which the UE is not in active communication with the network). The UE may periodically wake-up during a DRX on duration to monitor (e.g., on a physical downlink control channel (PDCCH)) for an indication to switch from the DRX inactive time to the DRX active time. When the UE wakes up during the DRX on duration, the UE may power on an associated modem and/or other components to perform the monitoring.

Some networks may further use wake-up signaling to indicate to the UE whether the UE is to wake-up and monitor for the indication to switch from the DRX inactive time to the DRX active time. The UE may use a relatively simple circuit to process the WUS, rather than powering on the associated modem and/or other components.

Some UEs may be configured to use two or more DRX groups to communicate with one or more base stations of a network. For example, the UE may use a first DRX group having one or more cells that operate in low-band or mid-band frequencies and may use a second DRX group having one or more cells that operate in high-band (e.g., millimeter wave (mmWave)) frequencies. If the UE receives a WUS indicating to the UE to wake-up, the UE may wake-up both of the DRX groups based at least in part on the WUS, and consume power, computing, and/or networking resources to monitor respective PDCCHs of the DRX groups. If the network has data buffered for transmission via the first DRX group and no data buffered for transmission via the second DRX group, the UE may waste power, computing, and/or network resources to start a DRX on duration timer for the second DRX group to monitor for an indication to switch from DRX inactive time to DRX active time when the network has no data buffered to send via the second DRX group. Additionally, if the second DRX group operates in relatively high frequencies, the UE may consume a relatively high amount of power to wake-up and monitor for the indication.

In some aspects described herein, a UE may selectively monitor, based at least in part on a configuration of the UE, a cell of a first DRX group for a WUS. Based at least in part on the WUS, the UE may selectively start, during a DRX cycle of the first DRX group associated with the WUS, a DRX on duration timer for a second DRX group. The DRX on duration timer for the second DRX group may be selectively started further based at least in part on whether the second DRX group has a DRX on duration occasion during the DRX cycle of the first DRX group.

In this way, the UE may reduce a frequency of unnecessarily starting a DRX on duration timer for the second DRX group when a network does not have data buffered for transmission via the second DRX group. For example, if the network has data buffered for transmission via the first DRX group and has no data buffered for transmission via the second DRX group, a base station of the network may provide a WUS associated with a DRX cycle of the first DRX group in which the second DRX group has no on duration occasion. In this way, the UE may start a DRX on duration timer for the first DRX group and not for the second DRX group, which may conserve power, computing, and/or network resources.

Figure 3:
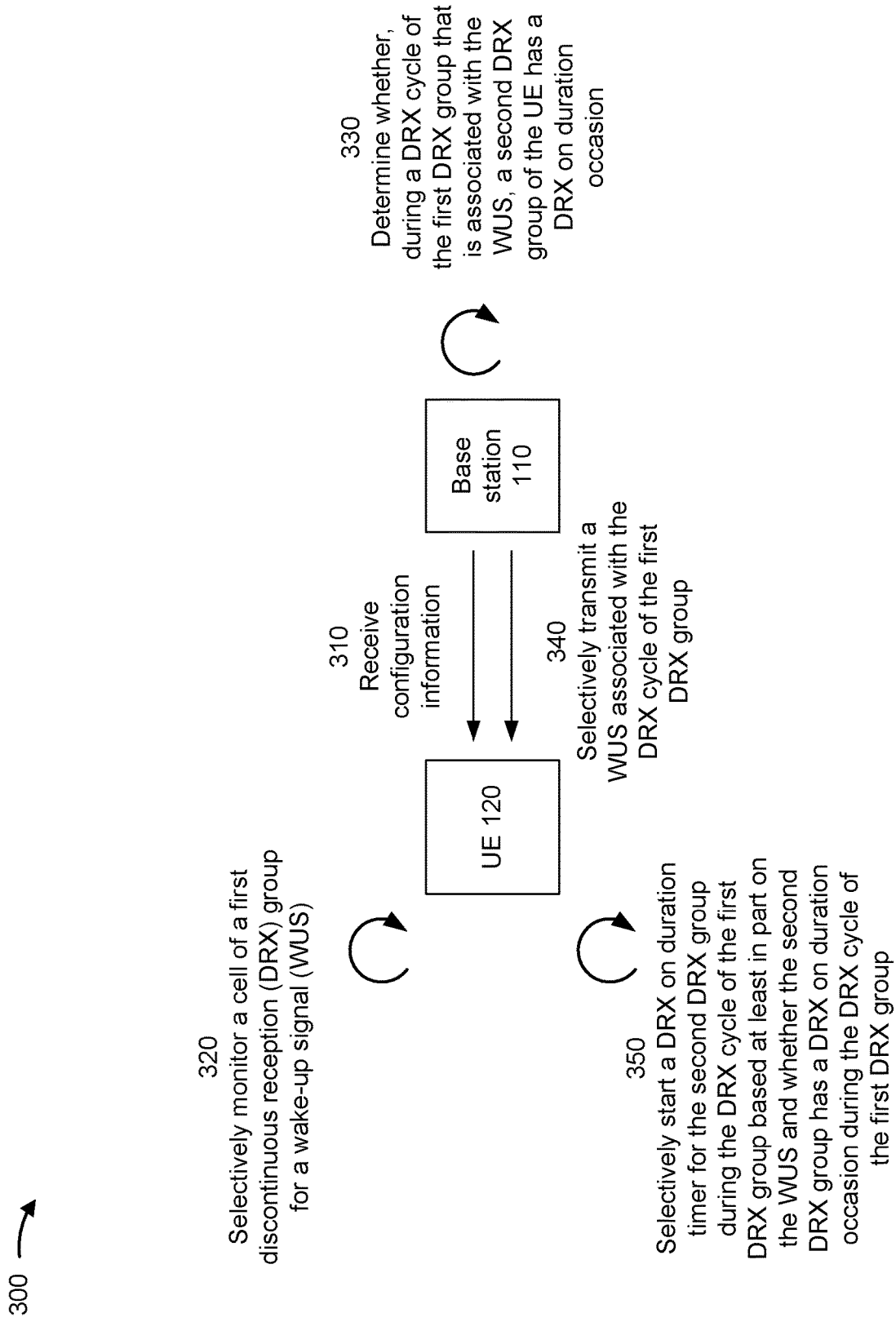
FIG. 3 is a diagram illustrating an example of wake-up signaling for discontinuous reception groups, in accordance with various aspects of the present disclosure.

FIG. 3 is a diagram illustrating an example 300 of wake-up signaling for discontinuous reception groups, in accordance with various aspects of the present disclosure. FIG. 3 shows UE 120 and base station 110 performing wake-up signaling for a plurality of DRX groups (e.g., a first DRX group and a second DRX group). In some aspects, the second DRX group may have a DRX on duration occasion in fewer than all DRX cycles of the first DRX group.

As shown in FIG. 3, and by reference number 310, UE 120 may receive configuration information (e.g., from base station 110). UE 120 may receive the configuration information via radio resource control (RRC) signaling, downlink control information (DCI), and/or the like.

In some aspects, the configuration information may indicate to UE 120 that the second DRX group is to have DRX on duration occasions during fewer than all DRX cycles of the first DRX group. In other words, the configuration information may indicate that the second DRX group is to have DRX cycle lengths that are different than (e.g., longer than, a multiple of, and/or the like) DRX cycle lengths of the first DRX group. The configuration information may, for example, indicate a length of a DRX inactive time, a DRX on duration timer, a DRX active time, a DRX cycle, and/or the like for the first DRX group and/or the second DRX group.

In some aspects, the configuration information may indicate that UE 120 is to monitor for the WUS only for DRX cycles of the first DRX group during which both of the first DRX group and the second DRX group have DRX on duration occasions. In other words, the configuration information may indicate that UE 120 is to monitor for WUSs associated with DRX cycles of the first DRX group only when the first DRX group and the second DRX group have DRX on duration occasions in a same DRX cycle. For example, if the second DRX group has DRX cycle lengths that are twice the DRX cycle lengths of the first DRX group, UE 120 may alternate between monitoring and not monitoring for WUSs associated with DRX cycles of the first DRX group.

In some aspects, the configuration information may indicate that UE 120 is to selectively start a DRX active time for the second DRX group based at least in part on whether UE 120 receives a WUS during a DRX active time of the first DRX group, whether the WUS indicates to start a DRX on duration timer, whether the second DRX group has a DRX on duration occasion during the DRX cycle of the first DRX group, and/or the like. For example, the configuration information may indicate that UE 120 is to start a DRX active time for the second DRX group during a DRX cycle of the first DRX group based at least in part on receiving a WUS indicating to start a DRX on duration timer, UE 120 receiving the WUS while the first DRX group is in DRX active time, and the second DRX group having no DRX on duration occasion during the DRX cycle of the first DRX group.

As shown by reference number 320, UE 120 may selectively monitor a cell of the first DRX group for a WUS. In some aspects, UE 120 may monitor the cell of the first DRX group based at least in part on a configuration of UE 120, whether the first DRX group is outside of a DRX active time, whether the second DRX group has a DRX on duration occasion during the DRX cycle of the first DRX group, and/or the like. In some aspects, the configuration of UE 120 may be periodically updated via updated configuration information (e.g. received from base station 110).

As shown by reference number 330, base station 110 may determine whether, during a DRX cycle of the first DRX group that is associated with the WUS, the second DRX group of UE 120 has a DRX on duration occasion. For example, base station 110 may be aware of configurations of DRX active times, DRX inactive times, and/or the like of the first DRX group and the second DRX group. Base station 110 may use the configurations to determine whether the second DRX group of UE 120 has a DRX on duration occasion during the DRX cycle of the first DRX group. In some aspects, base station 110, or another base station of a network associated with base station 110, may have previously transmitted, to UE 120, indications of the configurations of the DRX active times, DRX inactive times, and the like of the first DRX group and the second DRX group.

In some aspects, base station 110 may determine whether base station 110 has data buffered for transmission to UE 120 via the second DRX group. For example, if UE 120 communicates with base station 110 with a relatively low data rate that is sufficiently supported via the first DRX group (e.g. a bandwidth of the first DRX group is sufficient to support the data rate), base station 110 may not have data buffered for transmission to UE 120 via the second DRX group. If UE 120 communicates with base station 110 with a relatively high data rate that is not sufficiently supported via the first DRX group, base station 110 may buffer data for transmission via the second DRX group. If base station 110 has data buffered for transmission via the second DRX group, base station 110 may determine to transmit a WUS with an indication that UE 120 is to start a DRX on duration timer of the second DRX group, start a DRX active time of the second DRX group, and/or the like so that base station 110 may transmit the buffered data via the second DRX group.

In some aspects, base station 110 may determine whether, during the DRX cycle of the first DRX group, the first DRX group is outside of a DRX active time for the first DRX group. If UE 120 is configured to not monitor for a WUS when UE 120 is in active time, base station 110 may further determine to not send a WUS to UE 120 when UE 120 is in active time, whether or not base station 110 has data buffered for transmission via the first DRX group or the second DRX group. In some aspects, if base station 110 has data buffered to transmit via the first DRX group and/or the second DRX group, base station 110 may identify, for transmitting a WUS, a DRX cycle of the first DRX group for which UE 120 is configured to monitor for the WUS.

As shown by reference number 340, base station 110 may selectively transmit the WUS associated with the DRX cycle of the first DRX group. For example, base station 110 may transmit a WUS with an indication to start a DRX on duration timer during the DRX cycle of the first DRX group, may transmit a WUS with an indication to transmit a WUS with an indication to not start a DRX on duration timer during the DRX cycle of the first DRX group, or may not transmit a WUS. In some aspects, UE 120 may be configured to interpret a failure to receive a WUS from base station 110 to have the same effect as receiving a WUS with an indication to not start a DRX on duration timer during the DRX cycle of the first DRX group.

In some aspects, base station 110 may transmit the WUS based at least in part on whether the second DRX group has a DRX on duration occasion during the DRX cycle of the first DRX group, whether base station 110 has data buffered for transmission via the second DRX group, whether base station 110 has data buffered for transmission via the first DRX group, whether the first DRX group is outside of a DRX active time during the DRX cycle of the first DRX group of UE 120, and/or the like. For example, base station 110 may determine to transmit a WUS with an indication to start a DRX on duration timer based at least in part on the second DRX group having a DRX on duration occasion during the DRX cycle of the first DRX group, base station 110 having data buffered for transmission via the second DRX group and/or the first DRX group, the first DRX group being outside of a DRX active time (e.g., depending at least in part on the configuration of UE 120), and/or the like. In some aspects, base station 110 may determine to not transmit a WUS with an indication to start a DRX on duration timer based at least in part on the second DRX group not having a DRX on duration occasion during the DRX cycle of the first DRX group, base station 110 having no data buffered for transmission via the second DRX group and/or the first DRX group, the first DRX group being in a DRX active time during the DRX cycle of the first DRX group of UE 120, and/or the like.

In some aspects, base station 110 may not transmit a WUS associated with a particular DRX cycle of the first DRX group based at least in part on base station 110 having no data buffered for transmission via the second DRX group. Instead, base station 110 may identify, for transmitting a WUS with an indication to start a DRX on duration timer, a different DRX cycle of the first DRX group in which the second DRX group has no DRX on duration occasion so UE 120 does not need to start a DRX on duration timer for the second DRX group. If base station 110 has no data buffered for transmission via the second DRX group, and has data buffered to transmit via the first DRX group, base station 110 may choose to transmit a WUS indicating to start a DRX on duration timer during a DRX cycle of the first DRX group where the WUS would not cause UE 120 to start a DRX on duration timer for the second DRX group (which conserves power, computing, and/or network resources) and would start a DRX on duration timer for the first DRX group for which the data is buffered for transmission.

As shown by reference number 350, UE 120 may selectively start a DRX on duration timer for the second DRX group during the DRX cycle of the first DRX group based at least in part on the WUS and whether the second DRX group has a DRX on duration occasion during the DRX cycle of the first DRX group. For example, if the WUS indicates to start a DRX on duration timer, UE 120 may start a DRX on duration timer for the second DRX group during the DRX cycle if (e.g., only if) the second DRX group has a DRX on duration occasion during the DRX cycle of the first DRX group. If the second DRX group has no DRX on duration occasion during the DRX cycle, UE 120 may not start a DRX on duration timer for the second DRX group during the DRX cycle of the first DRX group. If the WUS includes an indication to not start a DRX on duration timer or if UE 120 does not receive the WUS, UE may not start a DRX on duration timer for the second DRX group and/or for the first DRX group.

In some aspects, if the WUS indicates to start a DRX on duration timer, UE 120 may start a DRX on duration timer for the first DRX group whether or not the second DRX group has a DRX on duration occasion. In this way, UE 120 may have some DRX cycles in which UE 120 may start a DRX on duration timer for only the first DRX group and other DRX cycles in which UE 120 may start DRX on duration timers for both of the first DRX group and the second DRX group.

In some aspects, selectively starting the DRX on duration timer for the second DRX group during the DRX cycle of the first DRX group is independent from a previous WUS associated with a previous DRX cycle of the first DRX group. In other words, whether to start a DRX on duration timer may be based at least in part on a most recently received WUS and may be independent from prior WUSs. This may mean that a WUS indicating to start a DRX on duration timer may not cause UE 120 to start a DRX on duration timer of the second DRX group during a following DRX cycle of the second DRX group if UE 120 receives an intervening WUS and/or if UE 120 monitors during the intervening WUS occasion.

For example, if UE 120 fails to receive an intervening WUS while monitoring for the WUS or receives an intervening WUS with an indication to not start a DRX on duration timer, UE may not start the DRX on duration timer of the second DRX group during the following DRX cycle. In some aspects, UE 120 may be configured to start the DRX on duration timer for the second DRX group during the following DRX cycle of the second DRX group if UE 120 does not monitor for the intervening WUS. In some aspects, UE 120 may be configured to not start the DRX on duration timer for the second DRX group during the following DRX cycle of the second DRX group if UE 120 does not monitor for the intervening WUS. UE 120 may be selectively configured (e.g., via configuration information from the network) to start or not start the DRX on duration timer for the second DRX group during the following DRX cycle of the second DRX group if UE 120 does not monitor for the intervening WUS.

In some aspects, UE 120 may start a DRX active time for the second DRX group based at least in part on configuration information, receiving the WUS indicating to start a DRX on duration timer during a DRX active time of the first DRX group, the second DRX group having no DRX on duration occasion during the DRX cycle of the first DRX group, and/or the like.

When UE starts a DRX on duration timer of the second DRX group, UE 120 may cause a modem and/or other components of UE 120 to monitor a PDCCH of one or more cells of the second DRX group for one or more indications to start a DRX active time for the one or more cells of the second DRX group.

By selectively monitoring the cell of the first DRX group for the WUS, based at least in part on the configuration of UE 120, and by selectively starting a DRX on duration timer for the second DRX group, as described herein, UE 120 may not monitor for the WUS for every DRX cycle of the first DRX group. Additionally, UE 120 may have some DRX cycles of the first DRX group in which UE 120 may start a DRX on duration timer for only the first DRX group and other DRX cycles in which UE 120 may start DRX on duration timers for both of the first DRX group and the second DRX group. In this way, UE 120 may conserve power, computing, and/or network resources that might otherwise have been used to monitor for a WUS during every DRX cycle of the first DRX group and/or starting DRX on duration timers for both DRX groups whenever UE 120 receives a WUS with an indication to start a DRX on duration timer.

As indicated above, FIG. 3 is provided as one or more examples. Other examples may differ from what is described with respect to FIG. 3.

FIGS. 4A-4D are diagrams illustrating examples 400, 420, 440, and 460 of wake-up signaling for discontinuous reception groups, in accordance with various aspects of the present disclosure. The examples 400, 420, 440, and 460 show various procedures taken by UE 120 based at least in part on configurations of UE 120 and/or WUSs.

Figure 4A:
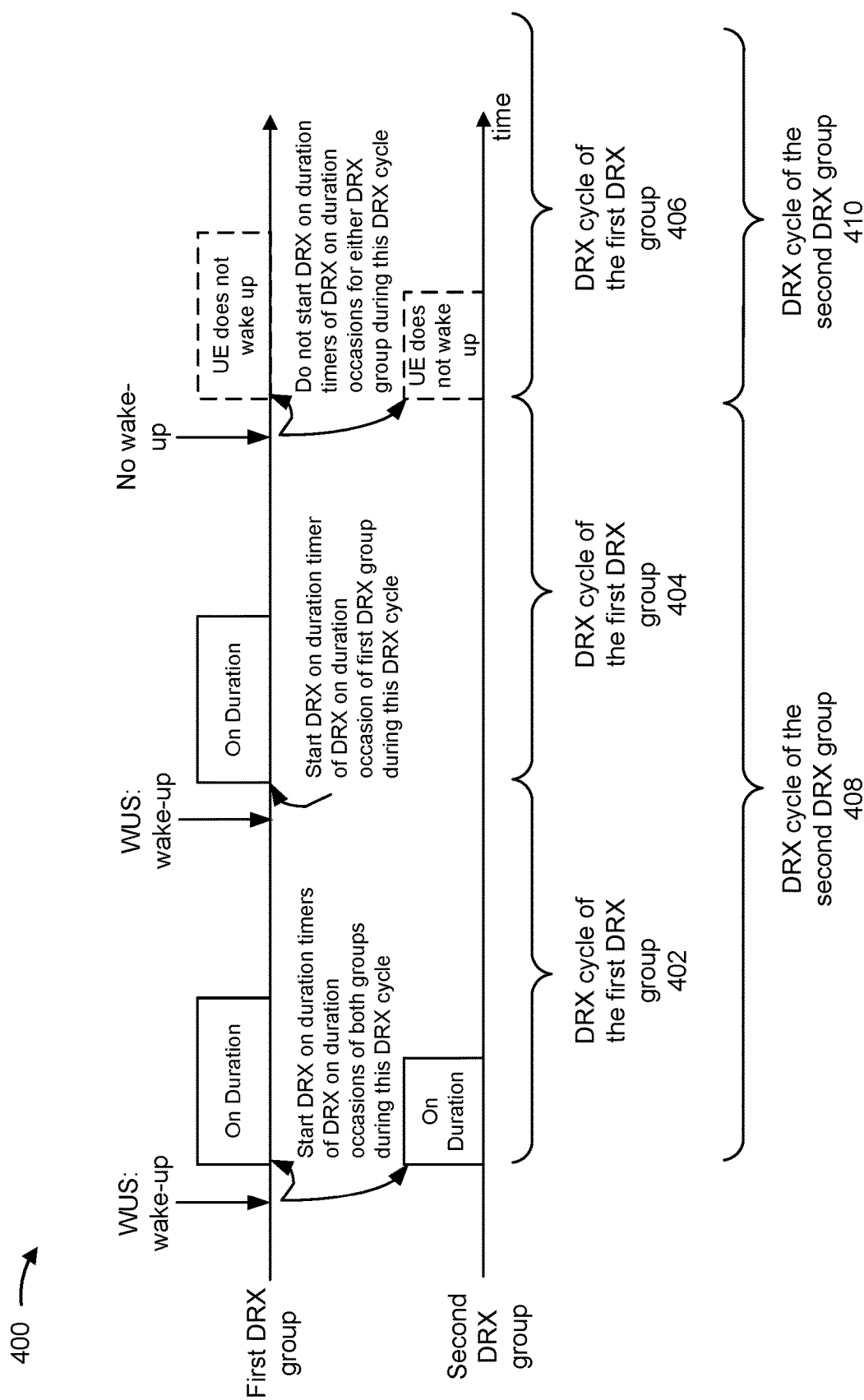
FIGS. 4A-4D are diagrams illustrating examples of wake-up signaling for discontinuous reception groups, in accordance with various aspects of the present disclosure.

FIG. 4A shows a first DRX cycle of the first DRX group 402, a second DRX cycle of the first DRX group 404, and a third DRX cycle of the first DRX group 406. FIG. 4A also shows a first DRX cycle of the second DRX group 408 and a second DRX cycle of the second DRX group 410. The second DRX group has DRX cycle lengths that are longer than DRX cycle lengths of the first DRX group. As shown, the DRX cycle length of the second DRX group is twice the DRX cycle length of the first DRX group. In some aspects, the DRX cycle length of the second DRX group may be a different multiple (e.g., 3×, 4×, and/or the like) of the DRX cycle length of the first DRX group.

The first DRX cycle of the first DRX group 402 includes a DRX on duration occasion for the first DRX group and a DRX on duration occasion for the second DRX group. During the first DRX cycle of the first DRX group 402, UE 120 monitors for, and receives, a WUS with an indication to start a DRX on duration timer (e.g., wake-up). UE 120 may monitor for the WUS based at least in part on the first DRX group being outside of a DRX active time. In some aspects, UE 120 may monitor for the WUS via a cell (e.g., a special cell) of the first DRX group.

Based at least in part on receiving the WUS with an indication to start a DRX on duration timer and the first DRX group and the second DRX group having DRX on duration occasions during the DRX cycle of the first DRX group 402, UE 120 starts DRX on duration timers for the first DRX group and the second DRX group during the first DRX cycle of the first DRX group 402. In some aspects, the WUS may not identify a particular DRX group for which UE 120 is to start a DRX on duration timer and UE 120 may initiate DRX on duration timers for all DRX groups that have DRX on duration occasions during the DRX cycle of the first DRX group that is associated with the WUS.

The second DRX cycle of the first DRX group 404 includes a DRX on duration occasion for the first DRX group and no DRX on duration occasion for the second DRX group. During the second DRX cycle of the first DRX group 404, UE 120 monitors for, and receives, a WUS with an indication to start a DRX on duration timer. UE 120 starts a DRX on duration timer for the first DRX group and does not start a DRX on duration timer for the second DRX group based at least in part on the first DRX group having a DRX on duration occasion during the second DRX cycle of the first DRX group 404 and the second DRX group not having a DRX on duration occasion during the second DRX cycle of the first DRX group 404.

The third DRX cycle of the first DRX group 406 includes DRX on duration occasions for the first DRX group and for the second DRX group. During the third DRX cycle of the first DRX group 406, UE 120 monitors for the WUS, but does not receive a WUS with an indication to start a DRX on duration timer. For example, UE 120 may monitor for the WUS, but not receive the WUS, or UE 120 may receive a WUS with an indication to not wake-up. Based at least in part on not receiving a WUS with an indication to start a DRX on duration timer, UE does not start a DRX on duration timer for the first DRX group or the second DRX group for DRX on duration occasions during the third DRX cycle of the first DRX group 406.

In some aspects, selectively starting the DRX timer for the second DRX group during a particular DRX cycle of the first DRX group may be independent from a previous WUS of a previous DRX cycle of the first DRX group. For example, in the third DRX cycle of the first DRX group 406, UE 120 does not start a DRX on duration timer for the second DRX group even though UE 120 never started a DRX on duration timer for the second DRX group after UE 120 received the WUS in the second DRX cycle of the first DRX group 404 that indicated to start a DRX on duration timer. In other words, a WUS with an indication to start or not start a DRX on duration timer does not always cause UE 120 to take responsive action for every DRX group. Instead, UE 120 may use only a most recently received WUS to take responsive actions for individual DRX groups that have a DRX on duration within a particular DRX cycle of the first DRX group.

Using the configuration of FIG. 4A, UE 120 may have some DRX cycles of the first DRX group for which UE 120 may respond to a WUS by starting DRX on duration timers for both DRX groups and some DRX cycles of the first DRX group for which UE 120 may respond to a WUS by starting a DRX on duration timer for only the first DRX group. In this way, UE 120 may conserve battery, computing, and/or network resources by allowing opportunities for WUSs to cause UE 120 to start a DRX on duration timer for only the first DRX group rather than for all DRX groups of UE 120.

Figure 4B:
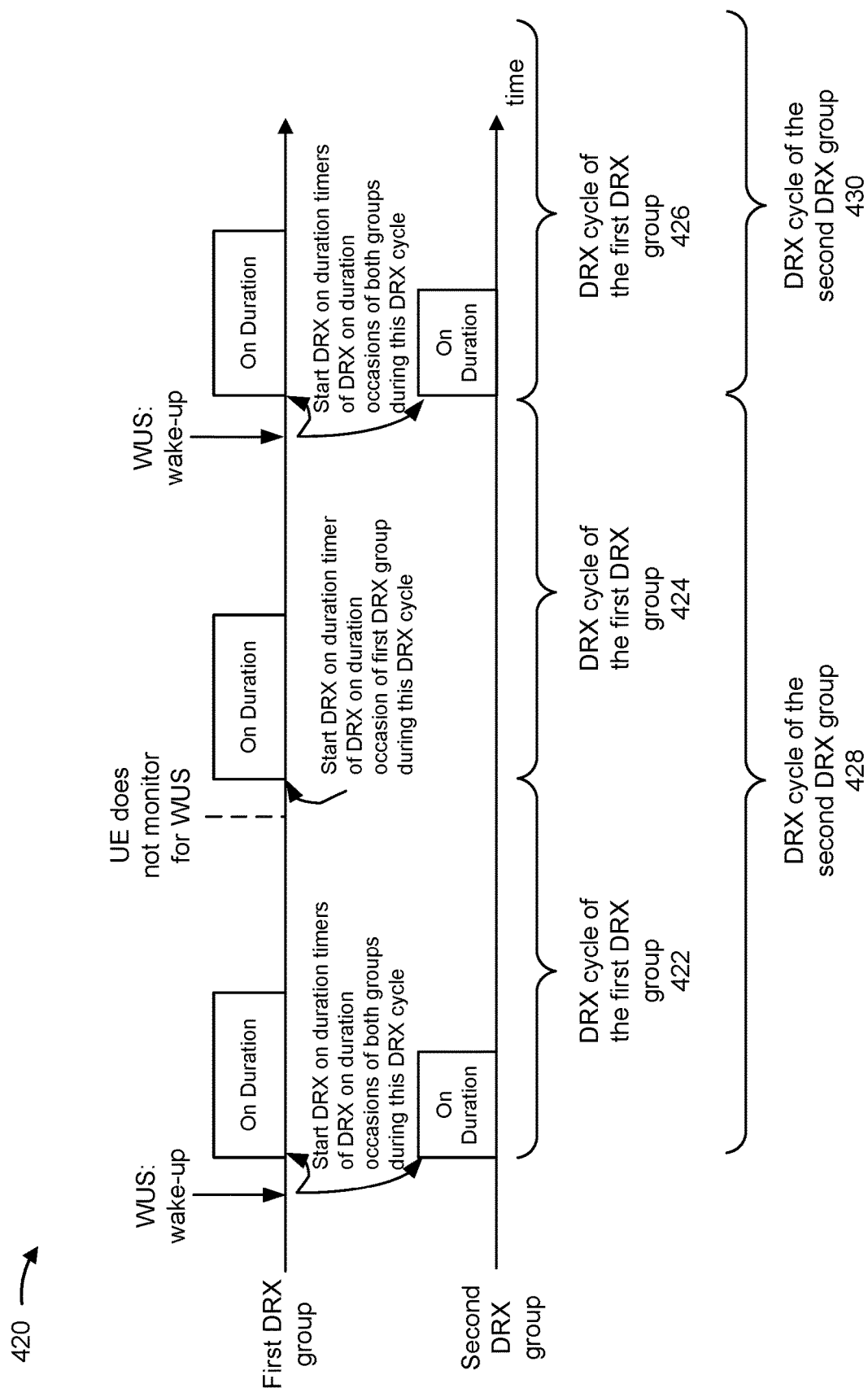

FIG. 4B shows a first DRX cycle of the first DRX group 422, a second DRX cycle of the first DRX group 424, and a third DRX cycle of the first DRX group 426. FIG. 4B also shows a first DRX cycle of the second DRX group 428 and a second DRX cycle of the second DRX group 430. As in FIG. 4A, the second DRX group has DRX cycle lengths that are longer than DRX cycle lengths of the first DRX group. UE 120 may be configured to monitor for the WUS only for DRX cycles of the first DRX group during which both of the first DRX group and the second DRX group have DRX on duration occasions.

The first DRX cycle of the first DRX group 422 includes a DRX on duration occasion for the first DRX group and a DRX on duration occasion for the second DRX group. During the first DRX cycle of the first DRX group 422, UE 120 monitors for, and receives, a WUS with an indication to start a DRX on duration timer. UE 120 may monitor for the WUS based at least in part on the first DRX group being outside of a DRX active time. In some aspects, UE 120 may monitor for the WUS via a cell (e.g., a special cell) of the first DRX group.

Based at least in part on receiving the WUS with an indication to start a DRX on duration timer, and the first DRX group and the second DRX group having DRX on duration occasions during the DRX cycle of the first DRX group 422, UE 120 starts DRX on duration timers for the first DRX group and the second DRX group during the first DRX cycle of the first DRX group 422.

The second DRX cycle of the first DRX group 424 includes a DRX on duration occasion for the first DRX group and no DRX on duration occasion for the second DRX group. During the second DRX cycle of the first DRX group 424, UE 120 does not monitor for a WUS based at least in part on the second DRX group having no DRX on duration occasion during the second DRX cycle of the first DRX group 424. Based at least in part on UE 120 not monitoring for the WUS during the second DRX cycle of the first DRX group 424, UE may start a DRX on duration timer for the first DRX group (e.g., by default). UE 120 may not start a DRX on duration timer for the second DRX group, based at least in part on the second DRX group not having a DRX on duration occasion during the second DRX cycle of the first DRX group 424.

The third DRX cycle of the first DRX group 426 includes a DRX on duration occasion for the first DRX group and a DRX on duration occasion for the second DRX group. As during the first DRX cycle of the first DRX group 422, during the third DRX cycle of the first DRX group 426, UE 120 monitors for, and receives, a WUS with an indication to start a DRX on duration timer. Based at least in part on receiving the WUS with an indication to start a DRX on duration timer, UE 120 starts DRX on duration timers for the first DRX group and the second DRX group.

Using the configuration of FIG. 4B, UE 120 may have some DRX cycles of the first DRX group for which UE 120 may start a DRX on duration timer for only the first DRX group (e.g., based on not monitoring for a WUS) and may configured to respond to a WUS by selectively starting DRX on duration timers for both DRX groups. In this way, UE 120 may conserve battery, computing, and/or network resources by allowing opportunities for base station 110 to not transmit a WUS (or transmit a WUS with an indication to not start a DRX on duration timer) when base station 110 has data buffered for transmission via the first DRX group and no data buffered for transmission via the second DRX group. For example, base station 110 may instead transmit an indication via a PDCCH during a DRX on duration occasion of the first DRX group during a DRX cycle of the first DRX group for which UE 120 does not monitor for the WUS.

Figure 4C:
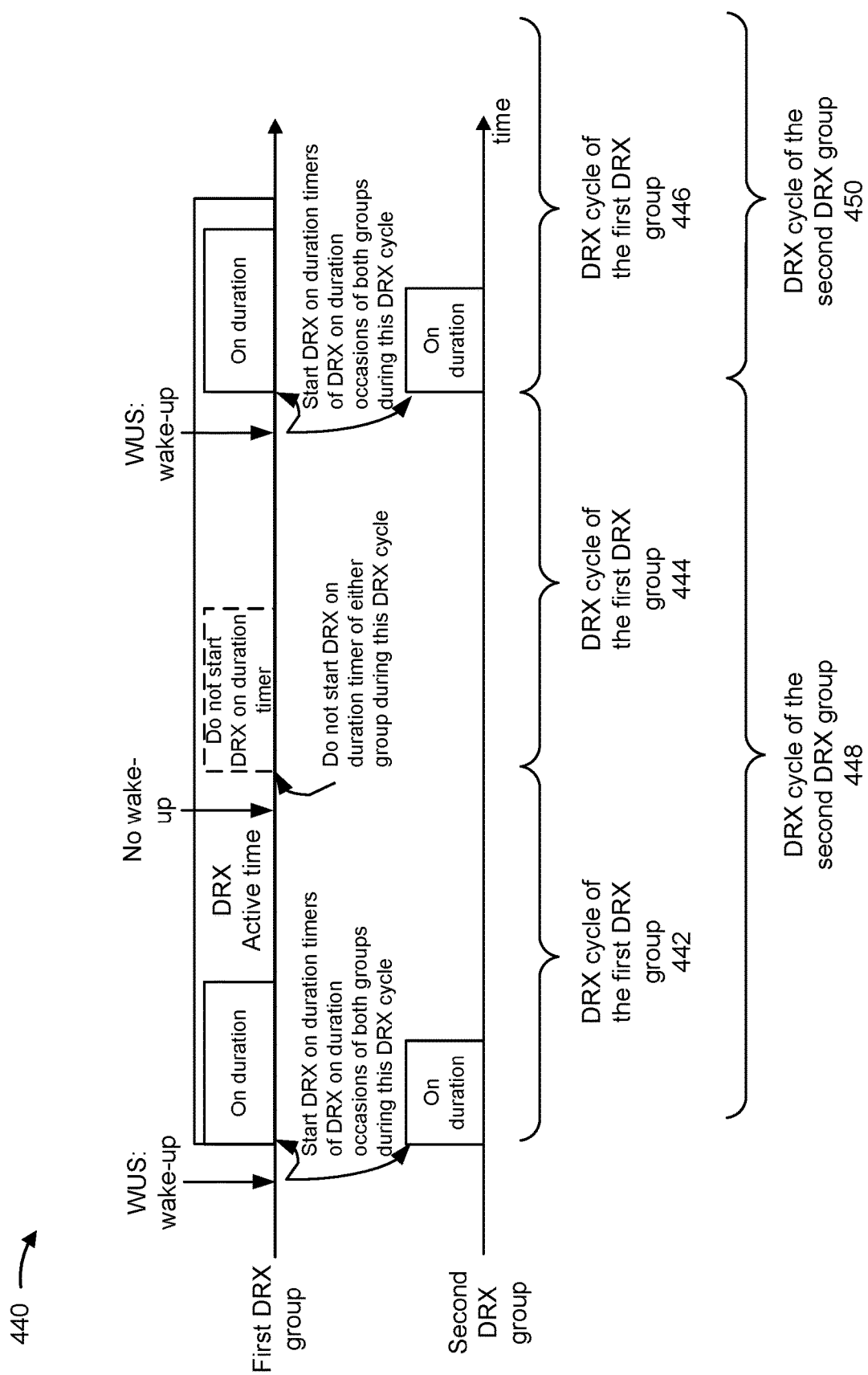

FIG. 4C shows a first DRX cycle of the first DRX group 442, a second DRX cycle of the first DRX group 444, and a third DRX cycle of the first DRX group 446. FIG. 4C also shows a first DRX cycle of the second DRX group 448 and a second DRX cycle of the second DRX group 450. As in FIG. 4A, the second DRX group has DRX cycle lengths that are longer than DRX cycle lengths of the first DRX group. UE 120 may be configured to monitor for the WUS when the first DRX group is in DRX active time. In some aspects, UE 120 may be configured to monitor for the WUS during DRX active time, DRX inactive time, and/or the like. UE 120 may also be configured not to start a DRX active time for the second DRX when UE 120 receives a WUS associated with a DRX cycle of the first DRX group in which the second DRX group has no DRX on duration occasion.

The first DRX cycle of the first DRX group 442 includes a DRX on duration occasion for the first DRX group and a DRX on duration occasion for the second DRX group. During the first DRX cycle of the first DRX group 442, UE 120 monitors for, and receives, a WUS with an indication to start a DRX on duration timer.

Based at least in part on receiving the WUS with an indication to start a DRX on duration timer, and the first DRX group and the second DRX group having DRX on duration occasions during the first DRX cycle of the first DRX group 442, UE 120 starts DRX on duration timers for the first DRX group and the second DRX group during the DRX cycle of the first DRX group 442. In some aspects, the first DRX group is switched to DRX active time (e.g., based at least in part on indications received during the DRX on duration time) and the first DRX group is switched to DRX inactive time after the DRX on duration timers.

The second DRX cycle of the first DRX group 444 includes a DRX on duration occasion for the first DRX group and no DRX on duration occasion for the second DRX group. During the second DRX cycle of the first DRX group 444, UE 120 monitors for, and does not receive, a WUS with an indication to start a DRX on duration timer. UE 120 does not start a DRX on duration timer for the first DRX group and does not start a DRX on duration timer for the second DRX group during the second DRX cycle of the first DRX group 444.

The third DRX cycle of the first DRX group 446 includes a DRX on duration occasion for the first DRX group and a DRX on duration occasion for the second DRX group. As during the first DRX cycle of the first DRX group 442, during the third DRX cycle of the first DRX group 446, UE 120 monitors for, and receives, a WUS with an indication to start a DRX on duration timer. Based at least in part on receiving the WUS with an indication to start a DRX on duration timer, UE 120 starts DRX on duration timers for the first DRX group and the second DRX group during the third DRX cycle of the first DRX group 446. In some aspects, the first DRX group may remain in DRX active time and the second DRX group may return to DRX inactive time. In some aspects, the second DRX group may instead be switched to DRX active time based at least in part on UE 120 receiving, during the DRX on duration time, an indication of data buffered for transmission via the second DRX group.

Using the configuration of FIG. 4C, UE 120 may use the first DRX group to serve traffic with a data rate that is relatively low when the first DRX group has sufficient bandwidth for the data rate. Base station 110 can indicate to UE 120 via a WUS, or a lack of a WUS, not to start a DRX on duration timer of the second DRX group for an associated DRX cycle of the first DRX group, which can conserve battery, computing, and/or network resources.

Figure 4D:
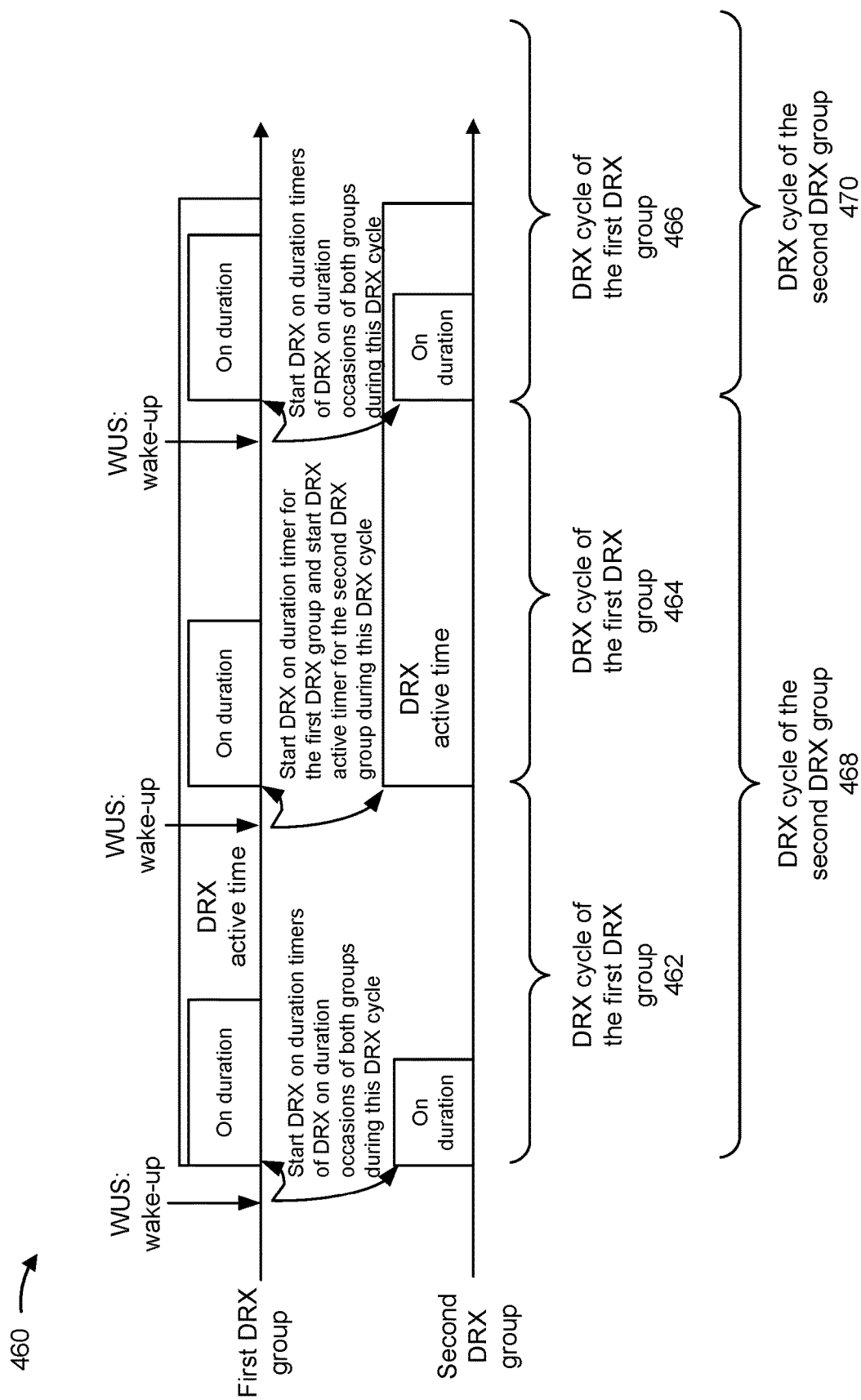

FIG. 4D shows a first DRX cycle of the first DRX group 462, a second DRX cycle of the first DRX group 464, and a third DRX cycle of the first DRX group 466. FIG. 4D also shows a first DRX cycle of the second DRX group 468 and a second DRX cycle of the second DRX group 470. As in FIG. 4A, the second DRX group has DRX cycle lengths that are longer than DRX cycle lengths of the first DRX group.

UE 120 may be configured to monitor for the WUS when the first DRX group is in DRX active time. In some aspects, UE 120 may be configured to monitor for the WUS during DRX active time, DRX inactive time, and/or the like. UE 120 may also be configured to start a DRX active time for the second DRX group when (e.g., immediately or soon after) UE 120 receives a WUS associated with a DRX cycle of the first DRX group in which the second DRX group has no DRX on duration occasion. UE 120 may start the DRX active time for the second DRX group even if a next DRX on duration occasion is set to begin later than that of the first DRX group. This configuration may be configurable by a network (e.g., by base station 110) via RRC signaling, DCI, and/or the like.

The first DRX cycle of the first DRX group 462 includes a DRX on duration occasion for the first DRX group and a DRX on duration occasion for the second DRX group. During the first DRX cycle of the first DRX group 462, UE 120 monitors for, and receives, a WUS with an indication to start a DRX on duration timer. In some aspects, UE 120 may monitor for the WUS while the first DRX group is outside of a DRX active time. In some aspects, UE 120 may monitor for the WUS via a cell (e.g., a special cell) of the first DRX group.

Based at least in part on receiving the WUS with an indication to start a DRX on duration timer, UE 120 starts DRX on duration timers for the first DRX group and the second DRX group. In some aspects, the first DRX group may be switched to DRX active time (e.g., based at least in part on indications received during the DRX on duration time) and the second DRX group may be switched to DRX inactive time.

The second DRX cycle of the first DRX group 464 includes a DRX on duration occasion for the first DRX group and no DRX on duration occasion for the second DRX group. During the second DRX cycle of the first DRX group 464, UE 120 monitors for, and receives, a WUS with an indication to start a DRX on duration timer. UE 120 starts a DRX on duration timer for the first DRX group and starts a DRX active time for the second DRX group.

A third DRX cycle of the first DRX group 466 includes a DRX on duration occasion for the first DRX group and a DRX on duration occasion for the second DRX group. During the third DRX cycle of the first DRX group 466, UE 120 monitors for, and receives, a WUS with an indication to start a DRX on duration timer. UE 120 may monitor for the WUS while the first DRX group is inside of a DRX active time.

Based at least in part on receiving the WUS with an indication to start a DRX on duration timer, UE 120 starts DRX on duration timers for the first DRX group and the second DRX group. In some aspects, the first DRX group may be switched to DRX inactive time and the second DRX group may be switched to DRX inactive time (e.g., based at least in part on indications received during the DRX on duration time).

Using the configuration of FIG. 4D, UE 120 may respond to a WUS indicating to start a DRX on duration timer, while the first DRX group is already in a DRX active time, by starting a DRX active time of the second DRX group. In this way, UE 120 may conserve battery, computing, and/or network resources by allowing a UE to start a DRX active time for the second DRX group without first starting a DRX on duration timer of the second DRX group.

As indicated above, FIGS. 4A-4D are provided as examples. Other examples may differ from what is described with respect to FIGS. 4A-4D.

Figure 5:
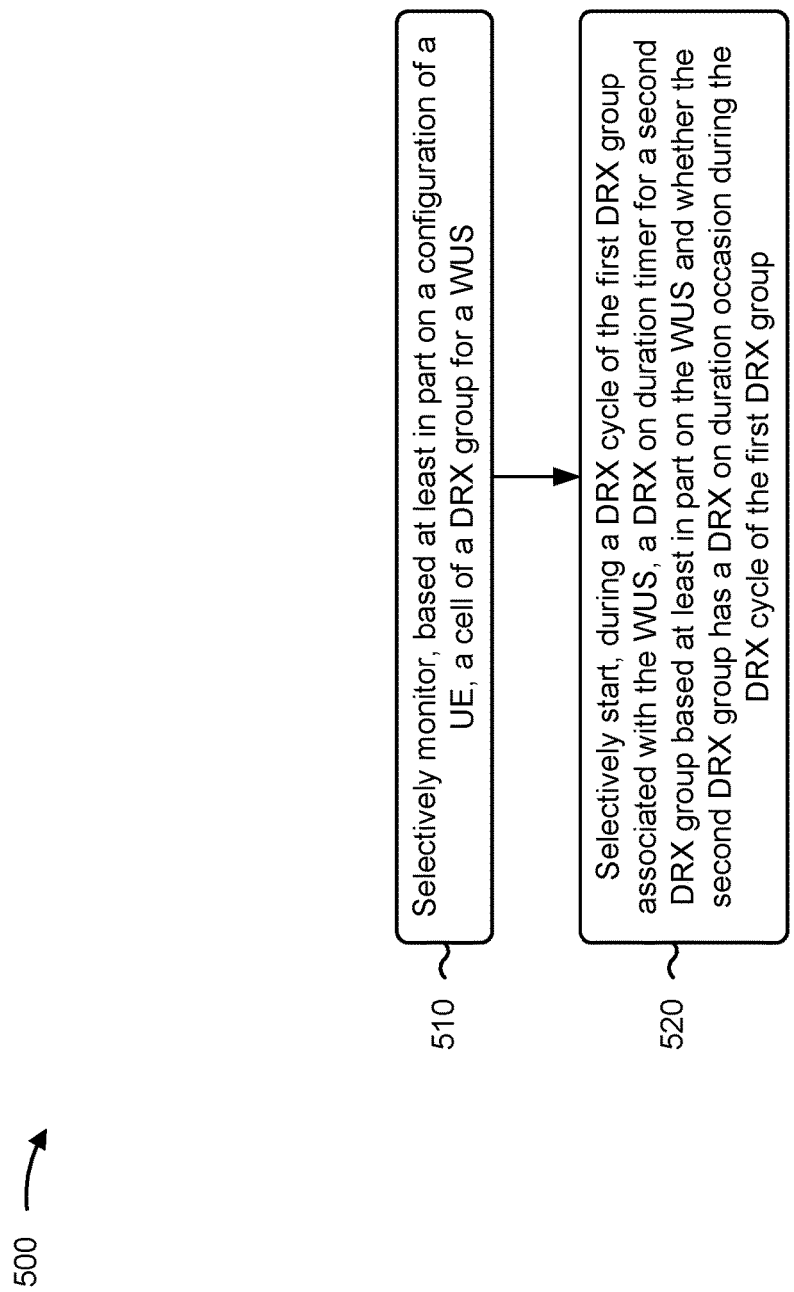
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with wake-up signaling for discontinuous reception groups.

As shown in FIG. 5, in some aspects, process 500 may include selectively monitoring, based at least in part on a configuration of the UE, a cell of a first DRX group for a WUS (block 510). For example, the UE (e.g., using receive processor 258, transmit processor 264, controller/processor 280, memory 282, and/or the like) may selectively monitor, based at least in part on a configuration of the UE, a cell of a first DRX group for a WUS, as described above.

As further shown in FIG. 5, in some aspects, process 500 may include selectively starting, during a DRX cycle of the first DRX group associated with the WUS, a DRX on duration timer for a second DRX group based at least in part on the WUS and whether the second DRX group has a DRX on duration occasion during the DRX cycle of the first DRX group (block 520). For example, the UE (e.g., using receive processor 258, transmit processor 264, controller/processor 280, memory 282, and/or the like) may selectively start, during a DRX cycle of the first DRX group associated with the WUS, a DRX on duration timer for a second DRX group based at least in part on the WUS and whether the second DRX group has a DRX on duration occasion during the DRX cycle of the first DRX group, as described above.

Process 500 may include additional aspects, such as any single aspect or any combination of aspects described below and/or in connection with one or more other processes described elsewhere herein.

In a first aspect, selectively monitoring the cell of the first DRX group for the WUS is based at least in part on whether the first DRX group is outside of a DRX active time.

In a second aspect, alone or in combination with the first aspect, process 500 includes starting the DRX on duration timer for the second DRX group based at least in part on receiving the WUS with an indication to start a DRX on duration timer and the second DRX group having a DRX on duration occasion during the DRX cycle of the first DRX group.

In a third aspect, alone or in combination with one or more of the first and second aspects, process 500 includes not starting the DRX on duration timer for the second DRX group based at least in part on: receiving the WUS with an indication to not start a DRX on duration timer, or not receiving the WUS.

In a fourth aspect, alone or in combination with one or more of the first through third aspects, process 500 includes selectively starting, based at least in part on the WUS, a DRX on duration timer for the first DRX group.

In a fifth aspect, alone or in combination with one or more of the first through fourth aspects, selectively starting the DRX on duration timer for the first DRX group comprises starting the DRX on duration timer for the first DRX group based at least in part on receiving the WUS with an indication to start a DRX on duration timer.

In a sixth aspect, alone or in combination with one or more of the first through fifth aspects, selectively starting the DRX on duration timer for the first DRX group comprises not starting the DRX on duration timer for the first DRX group based at least in part on: receiving the WUS with an indication to not start a DRX on duration timer, or not receiving the WUS.

In a seventh aspect, alone or in combination with one or more of the first through sixth aspects, selectively starting the DRX on duration timer for the second DRX group during the DRX cycle of the first DRX group is independent from a previous WUS associated with a previous DRX cycle of the first DRX group.

In an eighth aspect, alone or in combination with one or more of the first through seventh aspects, starting the DRX on duration timer for the second DRX group during the DRX cycle of the first DRX group comprises monitoring a physical downlink control channel of one or more cells of the second DRX group for one or more indications to start a DRX active time for the one or more cells of the second DRX group.

In a ninth aspect, alone or in combination with one or more of the first through eighth aspects, process 500 includes receiving, from a base station, configuration information that indicates to the UE that the second DRX group is to have DRX cycle lengths that are longer than DRX cycle lengths of the first DRX group.

In a tenth aspect, alone or in combination with one or more of the first through ninth aspects, receiving the configuration information comprises receiving the configuration information via radio resource control signaling.

In an eleventh aspect, alone or in combination with one or more of the first through tenth aspects, selectively monitoring the cell of the first DRX group for the WUS is based at least in part on whether the second DRX group has a DRX on duration occasion during the DRX cycle of the first DRX group.

In a twelfth aspect, alone or in combination with one or more of the first through eleventh aspects, process 500 includes receiving, from a base station, configuration information that indicates that the UE is to monitor for the WUS only for DRX cycles of the first DRX group during which both of the first DRX group and the second DRX group have DRX on duration occasions.

In a thirteenth aspect, alone or in combination with one or more of the first through twelfth aspects, process 500 includes determining, based at least in part on the second DRX group having no DRX on duration occasion during an additional DRX cycle of the first DRX group, not to monitor the cell of the first DRX group for the WUS; and starting, based at least in part on determining not to monitor the cell of the first DRX group for the WUS, a DRX on duration timer for the first DRX group during the additional DRX cycle of the first DRX group.

In a fourteenth aspect, alone or in combination with one or more of the first through thirteenth aspects, selectively monitoring the cell of the first DRX group for the WUS comprises monitoring, during a DRX active time of the first DRX group, the cell of the first DRX group for the WUS.

In a fifteenth aspect, alone or in combination with one or more of the first through fourteenth aspects, process 500 includes receiving configuration information indicating that the UE is to start a DRX active time for the second DRX group based at least in part on: receiving the WUS, during the DRX active time of the first DRX group, indicating to start a DRX on duration timer; and the second DRX group having no DRX on duration occasion during the DRX cycle of the first DRX group.

In a sixteenth aspect, alone or in combination with one or more of the first through fifteenth aspects, process 500 includes receiving the configuration information via radio resource control signaling.

In a seventeenth aspect, alone or in combination with one or more of the first through sixteenth aspects, process 500 includes selectively starting, based at least in part on the WUS and whether the second DRX group has a DRX on duration occasion during the DRX cycle of the first DRX group, a DRX active time for the second DRX group.

In an eighteenth aspect, alone or in combination with one or more of the first through seventeenth aspects, process 500 includes starting the DRX active time for the second DRX group based at least in part on receiving the WUS with an indication to start a DRX on duration timer and the second DRX group having no on duration occasion during the DRX cycle of the first DRX group.

In a nineteenth aspect, alone or in combination with one or more of the first through eighteenth aspects, the UE selectively starts the DRX on duration timer for the second DRX group during the DRX cycle of the DRX group associated with the WUS based at least in part on whether the UE monitors the cell of the first DRX group for the WUS.

In a twentieth aspect, alone or in combination with one or more of the first through nineteenth aspects, process 500 includes receiving, from a base station, configuration information that indicates to the UE whether the UE is to start a DRX on duration timer for the second DRX group if the UE does not monitor the cell of the first DRX group for the WUS.

In a twenty-first aspect, alone or in combination with one or more of the first through sixteenth aspects, the UE starts the DRX on duration timer for the second DRX group during the DRX cycle of the DRX group associated with the WUS based at least in part on whether the UE monitors the cell of the first DRX group for the WUS.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
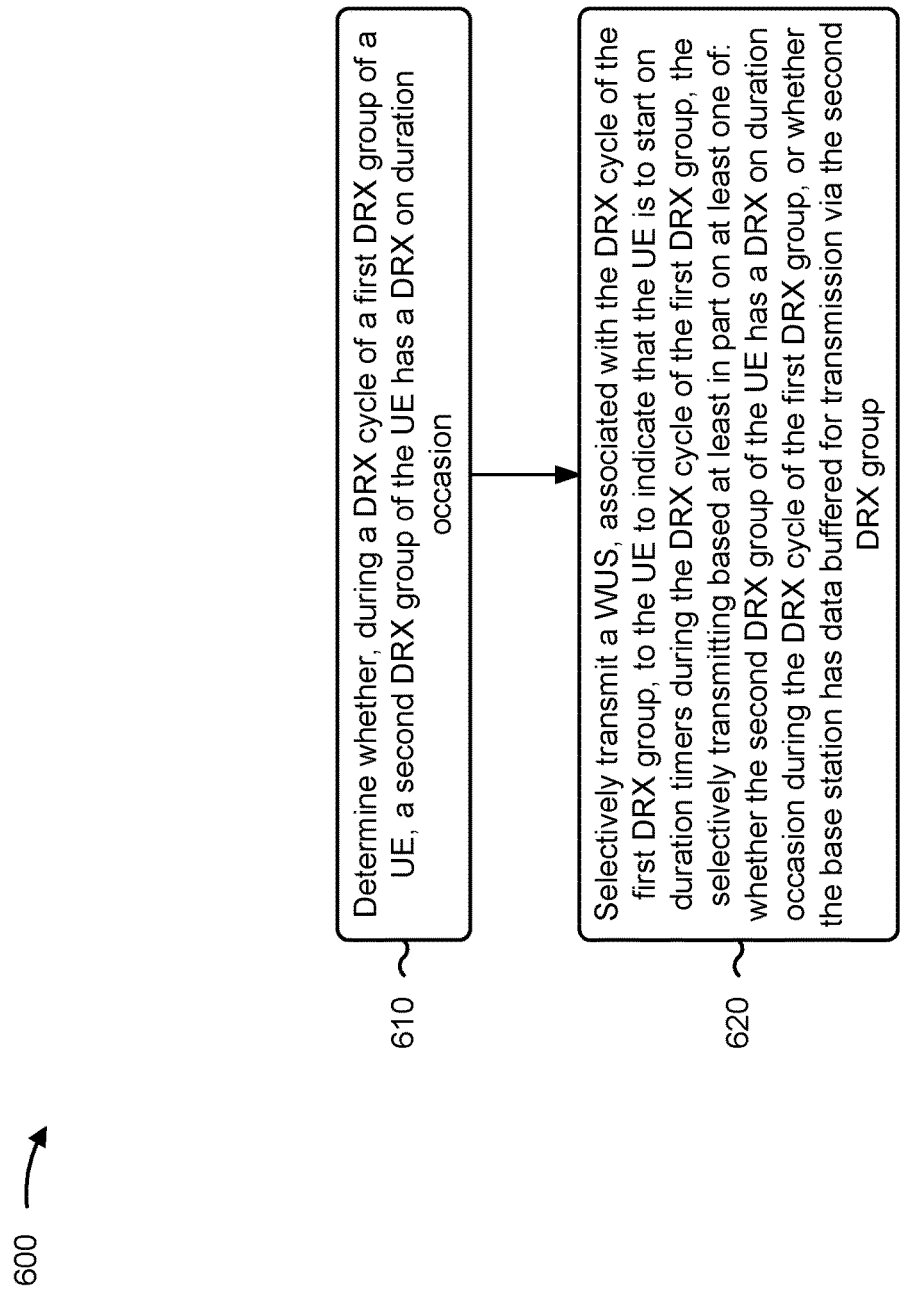
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. Example process 600 is an example where the base station (e.g., base station 110 and/or the like) performs operations associated with wake-up signaling for discontinuous reception groups.

As shown in FIG. 6, in some aspects, process 600 may include determining whether, during a DRX cycle of a first DRX group of a UE, a second DRX group of the UE has a DRX on duration occasion (block 610). For example, the base station (e.g., using receive processor 238, transmit processor 220, controller/processor 240, memory 242, and/or the like) may determine whether, during DRX cycle of a first DRX group of a UE, a second DRX group of the UE has a DRX on duration occasion, as described above.

As further shown in FIG. 6, in some aspects, process 600 may include selectively transmitting a WUS, associated with the DRX cycle of the first DRX group, to indicate that the UE is to start a DRX on duration timer during the DRX cycle of the first DRX group, wherein the WUS is selectively transmitted based at least in part on at least one of: whether the second DRX group of the UE has a DRX on duration occasion during the DRX cycle of the first DRX group, or whether the base station has data buffered for transmission via the second DRX group (block 620). For example, the base station (e.g., using receive processor 238, transmit processor 220, controller/processor 240, memory 242, and/or the like) may selectively transmit a WUS, associated with the DRX cycle of the first DRX group, to indicate that the UE is to start a DRX on duration timer during the DRX cycle of the first DRX group, wherein the WUS is selectively transmitted based at least in part on at least one of: whether the second DRX group of the UE has a DRX on duration occasion during the DRX cycle of the first DRX group, or whether the base station has data buffered for transmission via the second DRX group, as described above.

Process 600 may include additional aspects, such as any single aspect or any combination of aspects described below and/or in connection with one or more other processes described elsewhere herein.

In a first aspect, process 600 includes determining whether, during the DRX cycle of the first DRX group of the UE, the first DRX group of the UE is outside of a DRX active time, wherein the WUS is selectively transmitted further based at least in part on whether the first DRX group of the UE is outside of the DRX active time during the DRX cycle of the first DRX group of the UE.

In a second aspect, alone or in combination with the first aspect, process 600 includes determining that the second DRX group of the UE has the DRX on duration occasion during the DRX cycle of the first DRX group of the UE; determining that the base station has data buffered for transmission via the second DRX group of the UE; and transmitting, to the UE, the WUS with an indication to start a DRX on duration timer during the DRX cycle of the first DRX group of the UE.

In a third aspect, alone or in combination with one or more of the first and second aspects, process 600 includes determining one or more of: the second DRX group of the UE has no DRX on duration occasion during the DRX cycle of the first DRX group of the UE, or the base station has no data buffered for transmission via the second DRX group of the UE; and determining to not transmit the WUS with an indication to start a DRX on duration timer during the DRX cycle of the first DRX group of the UE.

In a fourth aspect, alone or in combination with one or more of the first through third aspects, process 600 includes transmitting, to the UE, the WUS with an indication to not start a DRX on duration timer during the DRX cycle of the first DRX group of the UE.

In a fifth aspect, alone or in combination with one or more of the first through fourth aspects, process 600 includes transmitting, to the UE, configuration information that indicates that the UE is to monitor for WUSs associated with DRX cycles of the first DRX group of the UE only when the first DRX group of the UE and the second DRX group of the UE have DRX on duration occasions in a same DRX cycle.

In a sixth aspect, alone or in combination with one or more of the first through fifth aspects, process 600 includes transmitting, to the UE, configuration information indicating to, upon receipt of the WUS, selectively start a DRX active time for the second DRX group of the UE based at least in part on one or more of: whether the first DRX group of the UE is in DRX active time, or whether the second DRX group of the UE has a DRX on duration occasion during the DRX cycle of the first DRX group of the UE.

In a seventh aspect, alone or in combination with one or more of the first through sixth aspects, transmitting the configuration information to the UE comprises transmitting the configuration information to the UE via radio resource control signaling.

In an eighth aspect, alone or in combination with one or more of the first through seventh aspects, process 600 includes transmitting, to the UE, configuration information indicating to start a DRX active time for the second DRX group of the UE based at least in part on one or more of: the first DRX group of the UE is in DRX active time, and the second DRX group of the UE having no DRX on duration occasion during the DRX cycle of the first DRX group of the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some aspects of the present disclosure:

Aspect 1: A method of wireless communication performed by a user equipment (UE), comprising: selectively monitoring, based at least in part on a configuration of the UE, a cell of a first discontinuous reception (DRX) group for a wake-up signal (WUS); and selectively starting, during a DRX cycle of the first DRX group associated with the WUS, a DRX on duration timer for a second DRX group based at least in part on the WUS and whether the second DRX group has a DRX on duration occasion during the DRX cycle of the first DRX group.

Aspect 2: The method of aspect 1, wherein selectively monitoring the cell of the first DRX group for the WUS is based at least in part on whether the first DRX group is outside of a DRX active time.

Aspect 3: The method of any of aspects 1 to 2, further comprising: starting the DRX on duration timer for the second DRX group based at least in part on receiving the WUS with an indication to start a DRX on duration timer and the second DRX group having a DRX on duration occasion during the DRX cycle of the first DRX group.

Aspect 4: The method of any of aspects 1 to 2, further comprising: not starting the DRX on duration timer for the second DRX group based at least in part on: receiving the WUS with an indication to not start a DRX on duration timer, or not receiving the WUS.

Aspect 5: The method of any of aspects 1 to 2, further comprising: selectively starting, based at least in part on the WUS, a DRX on duration timer for the first DRX group, wherein selectively starting the DRX on duration timer for the first DRX group comprises: starting the DRX on duration timer for the first DRX group based at least in part on receiving the WUS with an indication to start a DRX on duration timer, or not starting the DRX on duration timer for the first DRX group based at least in part on: receiving the WUS with an indication to not start a DRX on duration timer, or not receiving the WUS.

Aspect 6: The method of any of aspects 1 to 5, wherein selectively starting the DRX on duration timer for the second DRX group during the DRX cycle of the first DRX group is independent from a previous WUS associated with a previous DRX cycle of the first DRX group.

Aspect 7: The method of any of aspects 1 to 6, wherein starting the DRX on duration timer for the second DRX group during the DRX cycle of the first DRX group comprises: monitoring a physical downlink control channel of one or more cells of the second DRX group for one or more indications to start a DRX active time for the one or more cells of the second DRX group.

Aspect 8: The method of any of aspects 1 to 7, further comprising: receiving, from a base station, configuration information that indicates to the UE that the second DRX group is to have DRX cycle lengths that are longer than DRX cycle lengths of the first DRX group, wherein receiving the configuration information comprises: receiving the configuration information via radio resource control signaling. wherein receiving the configuration information comprises: receiving the configuration information via radio resource control signaling.

Aspect 9: The method of any of aspects 1 to 8, wherein selectively monitoring the cell of the first DRX group for the WUS comprises: monitoring, during a DRX active time of the first DRX group, the cell of the first DRX group for the WUS.

Aspect 10: The method of aspect 9, further comprising: receiving configuration information indicating that the UE is to start a DRX active time for the second DRX group based at least in part on: receiving the WUS, during the DRX active time of the first DRX group, indicating to start a DRX on duration timer; and the second DRX group having no DRX on duration occasion during the DRX cycle of the first DRX group.

Aspect 11: The method of aspect 9, further comprising: selectively starting, based at least in part on the WUS and whether the second DRX group has a DRX on duration occasion during the DRX cycle of the first DRX group, a DRX active time for the second DRX group.

Aspect 12: The method of aspect 11, further comprising: starting the DRX active time for the second DRX group based at least in part on receiving the WUS with an indication to start a DRX on duration timer and the second DRX group having no on duration occasion during the DRX cycle of the first DRX group.

Aspect 13: The method of any of aspects 1 to 2, wherein the UE selectively starts the DRX on duration timer for the second DRX group during the DRX cycle of the DRX group associated with the WUS based at least in part on whether the UE monitors the cell of the first DRX group for the WUS.

Aspect 14: An apparatus for wireless communication at a device, comprising a processor; memory coupled with the processor; and instructions stored in the memory and executable by the processor to cause the apparatus to perform the method of one or more aspects of aspects 1-13.

Aspect 15: A device for wireless communication, comprising a memory and one or more processors coupled to the memory, the memory and the one or more processors configured to perform the method of one or more aspects of aspects 1-13.

Aspect 16: An apparatus for wireless communication, comprising at least one means for performing the method of one or more aspects of aspects 1-13.

Aspect 17: A non-transitory computer-readable medium storing code for wireless communication, the code comprising instructions executable by a processor to perform the method of one or more aspects of aspects 1-13.

Aspect 18: A non-transitory computer-readable medium storing a set of instructions for wireless communication, the set of instructions comprising one or more instructions that, when executed by one or more processors of a device, cause the device to perform the method of one or more aspects of aspects 1-13.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more."

Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   monitoring, based at least in part on a configuration of the UE, a cell of a first discontinuous reception (DRX) group for a wake-up signal (WUS);
   monitoring a physical downlink control channel of a cell of a second DRX group for an indication to start a DRX active time for the cell of the second DRX group; and
   starting, during a DRX cycle of the first DRX group associated with the WUS, a DRX on duration timer for the second DRX group,
      where the DRX on duration timer for the second DRX group is started based at least in part on:
         the WUS,
         monitoring the physical downlink control channel of the cell of the second DRX group for the indication to start the DRX active time for the cell of the second DRX group, and
         whether the second DRX group has a DRX on duration occasion during the DRX cycle of the first DRX group.

2. The method of claim 1, wherein monitoring the cell of the first DRX group for the WUS is based at least in part on whether the first DRX group is outside of a DRX active time.

3. The method of claim 1, further comprising:
   starting the DRX on duration timer for the second DRX group based at least in part on the second DRX group having the DRX on duration occasion during the DRX cycle of the first DRX group.

4. The method of claim 1, further comprising:
   not starting the DRX on duration timer for the second DRX group based at least in part on:
      receiving the WUS with an indication to not start a DRX on duration timer, or
      not receiving the WUS.

5. The method of claim 1, further comprising:
   starting, based at least in part on the WUS, a DRX on duration timer for the first DRX group,
      wherein starting the DRX on duration timer for the first DRX group comprises:
         starting the DRX on duration timer for the first DRX group based at least in part on receiving the WUS with an indication to start a DRX on duration timer, or
         wherein the DRX on duration timer for the first DRX group is not started based at least in part on:
            receiving the WUS with an indication to not start a DRX on duration timer, or
            not receiving the WUS.

6. The method of claim 1, wherein starting the DRX on duration timer for the second DRX group during the DRX cycle of the first DRX group is independent from a previous WUS associated with a previous DRX cycle of the first DRX group.

7. The method of claim 1, further comprising:
   receiving, from a base station, configuration information that indicates to the UE that the second DRX group is to have DRX cycle lengths that are longer than DRX cycle lengths of the first DRX group,
   wherein receiving the configuration information comprises:
      receiving the configuration information via radio resource control signaling.

8. The method of claim 1, wherein monitoring the cell of the first DRX group for the WUS comprises:
   monitoring, during a DRX active time of the first DRX group, the cell of the first DRX group for the WUS.

9. The method of claim 8, further comprising:
   receiving configuration information indicating that the UE is to start a DRX active time for the second DRX group based at least in part on:
      receiving the WUS, during the DRX active time of the first DRX group, indicating to start a DRX on duration timer; and
      the second DRX group having no DRX on duration occasion during the DRX cycle of the first DRX group.

10. The method of claim 8, further comprising:
    starting, based at least in part on the WUS and whether the second DRX group has a DRX on duration occasion during the DRX cycle of the first DRX group, a DRX active time for the second DRX group.

11. The method of claim 10, further comprising:
    starting the DRX active time for the second DRX group based at least in part on receiving the WUS with an indication to start a DRX on duration timer and the second DRX group having no on duration occasion during the DRX cycle of the first DRX group.

12. The method of claim 1, wherein the UE starts the DRX on duration timer for the second DRX group during the DRX cycle of the DRX group associated with the WUS based at least in part on whether the UE monitors the cell of the first DRX group for the WUS.

13. A user equipment (UE) for wireless communication, comprising:
    a memory; and
    one or more processors coupled to the memory, the one or more processors configured to:
       monitor, based at least in part on a configuration of the UE, a cell of a first discontinuous reception (DRX) group for a wake-up signal (WUS);
       monitor a physical downlink control channel of a cell of a second DRX group for an indication to start a DRX active time for the cell of the second DRX group, and
       start, during a DRX cycle of the first DRX group associated with the WUS, a DRX on duration timer for the second DRX group,
          wherein the DRX on duration time for the second DRX group is started based at least in part on:
             the WUS,
             monitoring the physical downlink control channel of the cell of the second DRX group for the indication to start the DRX active time for the cell of the second DRX group, and
             whether the second DRX group has a DRX on duration occasion during the DRX cycle of the first DRX group.

14. The UE of claim 13, wherein monitoring the cell of the first DRX group for the WUS is based at least in part on whether the first DRX group is outside of a DRX active time.

15. The UE of claim 13, wherein the one or more processors are further configured to:
    start the DRX on duration timer for the second DRX group based at least in part on the second DRX group having the DRX on duration occasion during the DRX cycle of the first DRX group.

16. The UE of claim 13, wherein the one or more processors are further configured to:
not start the DRX on duration timer for the second DRX group based at least in part on:
receiving the WUS with an indication to not start a DRX on duration timer, or
not receiving the WUS.

17. The UE of claim 13, wherein the one or more processors are further configured to:
start, based at least in part on the WUS, a DRX on duration timer for the first DRX group,
wherein the one or more processors, when starting the DRX on duration timer for the first DRX group, are configured to:
start the DRX on duration timer for the first DRX group based at least in part on receiving the WUS with an indication to start a DRX on duration timer, or
wherein the DRX on duration timer for the first DRX group is not started based at least in part on:
receiving the WUS with an indication to not start a DRX on duration timer, or
not receiving the WUS.

18. The UE of claim 13, wherein starting the DRX on duration timer for the second DRX group during the DRX cycle of the first DRX group is independent from a previous WUS associated with a previous DRX cycle of the first DRX group.

19. The UE of claim 13, wherein the one or more processors are further configured to:
receive, from a base station, configuration information that indicates to the UE that the second DRX group is to have DRX cycle lengths that are longer than DRX cycle lengths of the first DRX group,
wherein the one or more processors, when receiving the configuration information, are configured to:
receive the configuration information via radio resource control signaling.

20. The UE of claim 13, wherein the one or more processors, when monitoring the cell of the first DRX group for the WUS, are configured to:
monitor, during a DRX active time of the first DRX group, the cell of the first DRX group for the WUS.

21. The UE of claim 20, wherein the one or more processors are further configured to:
receive configuration information indicating that the UE is to start a DRX active time for the second DRX group based at least in part on:
receiving the WUS, during the DRX active time of the first DRX group, indicating to start a DRX on duration timer; and
the second DRX group having no DRX on duration occasion during the DRX cycle of the first DRX group.

22. The UE of claim 20, wherein the one or more processors are further configured to:
start, based at least in part on the WUS and whether the second DRX group has a DRX on duration occasion during the DRX cycle of the first DRX group, the DRX active time for the second DRX group.

23. The UE of claim 22, wherein the one or more processors are further configured to:
start the DRX active time for the second DRX group based at least in part on receiving the WUS with an indication to start a DRX on duration timer and the second DRX group having no on duration occasion during the DRX cycle of the first DRX group.

24. The UE of claim 13, wherein the UE starts the DRX on duration timer for the second DRX group during the DRX cycle of the DRX group associated with the WUS based at least in part on whether the UE monitors the cell of the first DRX group for the WUS.

25. A non-transitory computer-readable medium storing a set of instructions for wireless communication, the set of instructions comprising:
one or more instructions that, when executed by one or more processors of a user equipment (UE), cause the UE to:
monitor, based at least in part on a configuration of the UE, a cell of a first discontinuous reception (DRX) group for a wake-up signal (WUS);
monitoring a physical downlink control channel of a cell of a second DRX group for an indication to start a DRX active time for the cell of the second DRX group; and
start, during a DRX cycle of the first DRX group associated with the WUS, a DRX on duration timer for the second DRX group,
wherein the DRX on duration timer for the second DRX group is started based at least in part on:
the WUS,
monitoring the physical downlink control channel of the cell of the second DRX group for the indication to start the DRX active time for the cell of the second DRX group, and
whether the second DRX group has a DRX on duration occasion during the DRX cycle of the first DRX group.

26. The non-transitory computer-readable medium of claim 25, wherein monitoring the cell of the first DRX group for the WUS is based at least in part on whether the first DRX group is outside of a DRX active time.

27. The non-transitory computer-readable medium of claim 25, wherein the DRX on duration timer for the second DRX group is started during the DRX cycle of the DRX group associated with the WUS based at least in part on whether the UE monitors the cell of the first DRX group for the WUS.

28. The non-transitory computer-readable medium of claim 25, wherein starting the DRX on duration timer for the second DRX group during the DRX cycle of the first DRX group is independent from a previous WUS associated with a previous DRX cycle of the first DRX group.

29. An apparatus for wireless communication, comprising:
means for monitoring, based at least in part on a configuration of the apparatus, a cell of a first discontinuous reception (DRX) group for a wake-up signal (WUS);
means for monitoring a physical downlink control channel of a cell of a second DRX group for an indication to start a DRX active time for the cell of the second DRX group; and
means for starting, during a DRX cycle of the first DRX group associated with the WUS, a DRX on duration timer for the second DRX group,
wherein the DRX on duration timer for the second DRX group is started based at least in part on:
the WUS,
monitoring the physical downlink control channel of the cell of the second DRX group for the indication to start the DRX active time for the cell of the second DRX group, and whether the second DRX group has a DRX on duration occasion during the DRX cycle of the first DRX group.

30. The apparatus of claim 29, wherein monitoring the cell of the first DRX group for the WUS is based at least in part on whether the first DRX group is outside of a DRX active time.

* * * * *